(12) United States Patent
Tuchtenhagen

(10) Patent No.: US 7,102,800 B2
(45) Date of Patent: Sep. 5, 2006

(54) METHODS AND APPARATUS FOR PROVIDING IMAGING MEDIA IN IMAGING APPARATUS

(75) Inventor: Brian Tuchtenhagen, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 963 days.

(21) Appl. No.: 10/087,470

(22) Filed: Feb. 27, 2002

(65) Prior Publication Data

US 2003/0160979 A1   Aug. 28, 2003

(51) Int. Cl.
*H04N 1/04* (2006.01)
*B65H 7/00* (2006.01)

(52) U.S. Cl. ............... 358/498; 358/1.12; 271/256; 271/9.01

(58) Field of Classification Search ............ 358/498, 358/1.15, 1.12, 1.13, 1.14, 1.16, 401, 496, 358/501; 399/391, 388, 389, 386, 398; 271/256, 271/258.02, 9.01, 9.13, 9.07, 3.15, 3.17, 271/3.18
See application file for complete search history.

(56) References Cited

U.S. PATENT DOCUMENTS

| | | | | |
|---|---|---|---|---|
| 5,495,561 A | * | 2/1996 | Holt | 358/1.15 |
| 6,894,791 B1 | * | 5/2005 | Wheeler | 358/1.12 |
| 6,947,159 B1 | * | 9/2005 | Wheeler | 358/1.15 |
| 6,952,280 B1 | * | 10/2005 | Tanimoto | 358/1.15 |

* cited by examiner

*Primary Examiner*—Cheukfan Lee

(57) ABSTRACT

An imaging apparatus has a primary media tray, a priority media feed tray, and a media feed mechanism configured to extract media from the priority feed tray and the primary media feed tray. The imaging apparatus further includes a priority media release device configured to selectively block media in the priority feed tray from being released to the media feed mechanism, and admit media in the priority feed tray to the priority media feed mechanism. In one configuration the priority media release device has a priority media release member selectively moveable from a first position to block media in the priority feed tray from the media feed mechanism, to a second position to admit media in the priority feed tray to the media feed mechanism.

30 Claims, 9 Drawing Sheets

METHODS AND APPARATUS FOR PROVIDING IMAGING MEDIA IN IMAGING APPARATUS

FIELD OF THE INVENTION

The invention claimed and disclosed herein pertains to imaging apparatus, and particularly to methods an apparatus for releasing imaging media within an imaging apparatus.

BACKGROUND OF THE INVENTION

The present invention addresses a common problem encountered by users of imaging apparatus. More specifically, the present invention provides for methods and apparatus to reduce the likelihood that special imaging media is printed with the wrong print job.

Imaging apparatus, as the term is used herein, include printers (such as self-standing units and table-top computer printers, for example), photocopiers, and other apparatus which are configured to generate an image on imaging media. Non-limiting examples of imaging media include paper, transparencies, card stock, envelopes, and labels. The present invention is particularly useful for imaging apparatus which generate an image on imaging media using a digital file (a "print file") as the image source. The invention is also particularly useful for imaging apparatus which are used in a shared manner within a computer network. That is, a computer network can include a central server which is configured to direct print jobs from a number of different user stations to a central imaging apparatus. (A "print job" is a digital file containing instructions to allow the imaging apparatus to generate an image, such as text and/or graphics, on imaging media.) The user stations can be, for example, computer workstations or desk-top computers. The network configuration thus allows a plurality of users to access one or more imaging apparatus, reducing the number of imaging apparatus required to support all of the users.

Imaging apparatus are generally configured with one of more primary media trays. (Imaging media trays are commonly known as "paper trays", although the use of the term should not be considered as limiting the type of media contained in the tray.) For example, an imaging apparatus can have a first paper tray configured to hold letter-sized paper, and a second paper tray configured to hold legal sized paper. In addition to the primary media tray(s), an imaging apparatus can include a priority imaging media tray, also known sometimes as a bypass tray. The priority tray allows a user to print a print job on specialty imaging media (i.e., imaging media not contained in the primary tray(s)) without having to remove the imaging media in the primary tray(s). For example, a user may desire to print an address on an envelope, or print a sheet of adhesive labels. Accordingly, the user will load the desired specialty media into the priority media tray, and then print the desired image onto the specialty media.

Many prior art imaging apparatus which contain a priority media tray are configured to require an additional drive mechanism to allow the user to associate a print job with the media within the priority tray. This is accomplished by providing the imaging apparatus with a priority tray media detection device (such as a switch or a sensor) which detects the presence of media within the priority tray. When media is detected in the priority tray, the imaging apparatus actuates media feed components (mostly comprising feed rollers) to pull media from the priority tray, and to print the next-received print job onto that media. Other prior art imaging apparatus have only a single feed mechanism comprising a feed roller which picks or feeds media from a common feed area. In this configuration, both the primary media tray and the priority media tray position media in the common feed area, and the feed roller thus feeds the next sheet of media presented to the roller. A problem with this configuration is that the user can insert specialty media into the priority tray, but then may send a different print job (i.e., a print job not intended to be imaged onto the specialty media) to the imaging apparatus, forgetting that the imaging apparatus has been loaded with specialty media. The result is that the print job is imaged onto the specialty media, when it was not intended to be. That is, since the imaging apparatus has no way to differentiate one type of media from another, the next print job received by the imaging apparatus will be imaged onto the media in the priority tray, whether it was intended to be or not. This results in wastage (primarily of the specialty media), as well as lost time since the user will need to reprint the print job once it has been discovered that the print job was imaged onto the wrong media.

What is needed then are methods and apparatus to allow the use of a priority media tray with an imaging apparatus which achieves the benefits to be derived from similar prior art methods and apparatus, but which avoids the shortcomings and detriments individually associated therewith.

SUMMARY OF THE INVENTION

A first embodiment of the present invention provides for an imaging apparatus comprising a priority media feed tray and a media feed mechanism configured to extract media from the priority feed tray. A priority media release device is configured to selectively block media in the priority feed tray from the media feed mechanism, and admit media in the priority feed tray to the media feed mechanism upon request. In one example, the priority media release device comprises a priority media release member selectively moveable from a first position to block media in the priority feed tray from the media feed mechanism, to a second position to admit media in the priority feed tray to the media feed mechanism.

A second embodiment of the present invention provides for a method of providing imaging media to an imaging apparatus to allow the imaging apparatus to use an image file to generate an image onto the imaging media. The method includes providing the imaging media in a priority media tray, and providing the image file with an imaging media release command. The method further includes releasing the imaging media from the priority media tray to the imaging apparatus only when the image file has an imaging media release command.

These and other aspects and embodiments of the present invention will now be described in detail with reference to the accompanying drawings, wherein:

DETAILED DESCRIPTION OF THE INVENTION

The present invention provides methods and apparatus to provide greater assurance that a print job will be imaged on the intended imaging media, and particularly when the imaging media can be provided via a priority media tray in an imaging apparatus. The invention is particularly (but not exclusively) useful in a network environment where a plurality of users each have the ability to send a print job to a common imaging apparatus ("printer"). In this case, the present invention allows only print jobs requiring media from the priority tray to be printed on media from the priority tray. This differs from the prior art, wherein the first print job sent to the printer would normally be printed on media in the priority tray, regardless of whether or not the print job was intended to be printed on such media.

The present invention is applicable to imaging apparatus, which were defined and described above in the section entitled "Background". In the following discussion, I will use the terms "print", "printing" and "printer" to also mean respectively "image", "imaging" and "imaging apparatus", although it is understood that the use of such terms is not to be considered as limiting the invention to any one particular type of imaging apparatus, or any particular uses of imaging apparatus. Further, I will use the expression "print job" to mean a file (preferably, a digital file) which is electronically transmitted to an imaging apparatus to allow the imaging apparatus to generate an image, on imaging media, of an image file portion of the print job.

I will now describe specific examples of different embodiments of the present invention with respect to the accompanying figures. It should be understood that the figures are not necessarily to scale, and that certain details not relevant to implementation of the present invention have been omitted for the sake of simplicity and to facilitate understanding of the invention. It should be further understood that the attached drawings depict only exemplary embodiments of the present invention, and should not be construed as limiting the scope of the invention or the appended claims.

Figure 1:
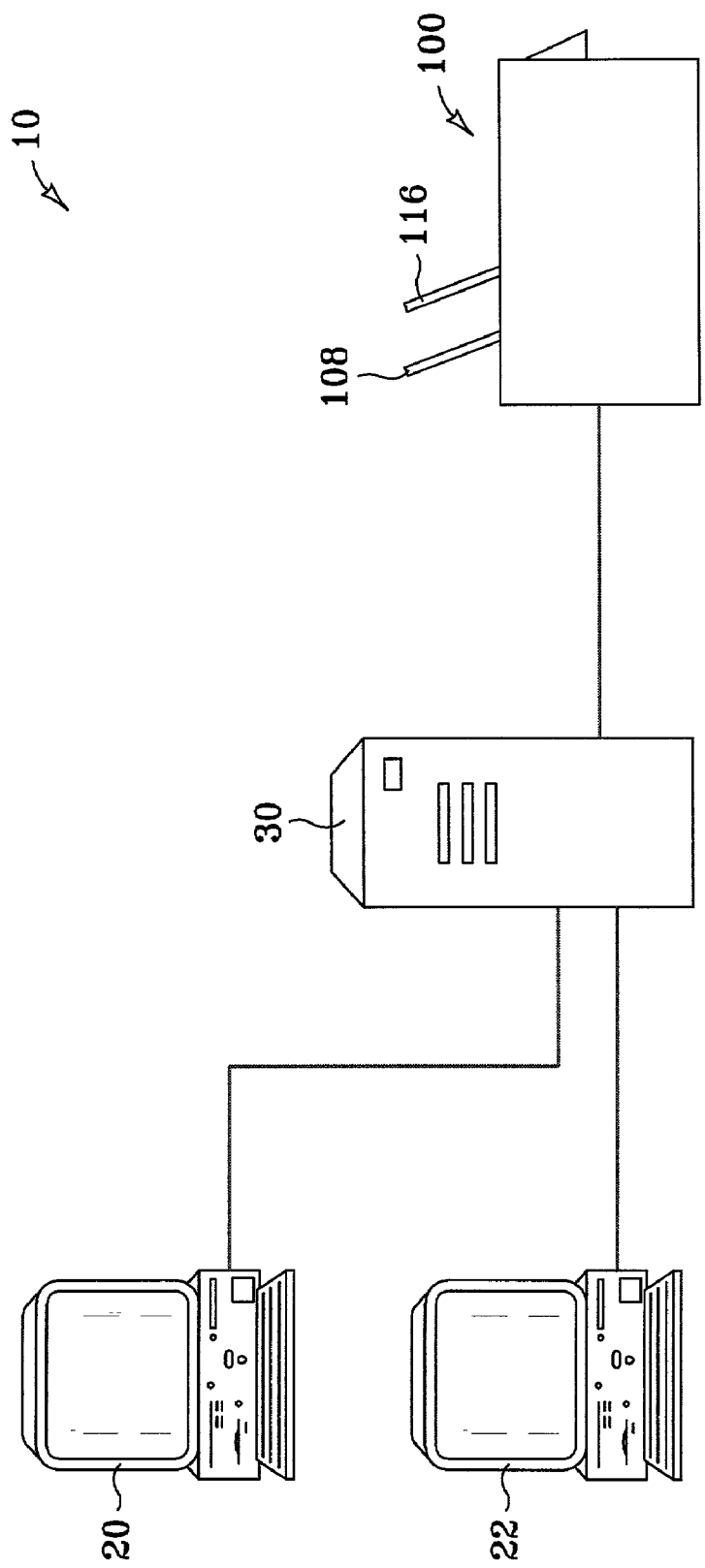
FIG. 1 is a schematic diagram depicting a network system having an imaging apparatus of the present invention as part of the network.

Turning now to FIG. 1, a schematic diagram depicts a computer network system 10 in accordance with one embodiment of the present invention. The network 10 includes a plurality of user stations 20 and 22 which can be, for example, workstations or personal computers. The network 10 further includes an imaging apparatus 100 in signal communication with the user stations 20 and 22 such that the imaging apparatus can receive print jobs from the user stations. The network 10 can include a network server 30 to allow the imaging apparatus 100 to receive print jobs from the user stations 20 and 22 via the network server 30. However, a network server 30 is not necessary, and the user stations 20 and 22 can be networked directly to the imaging apparatus 100 using known networking devices and methods. The imaging apparatus 100 includes a primary media feed tray 108, as well as a priority media feed tray (or "bypass tray") 116, each of which are configured to contain imaging media. As will be described more fully below, the imaging apparatus 100 further includes a priority media release device (not shown in FIG. 1). The priority media release device is configured to release imaging media from the priority media feed tray 116 only when a print job sent to the imaging apparatus 100 contains a designation that imaging media for the print job is to be provided from the priority media feed tray.

Figure 2:
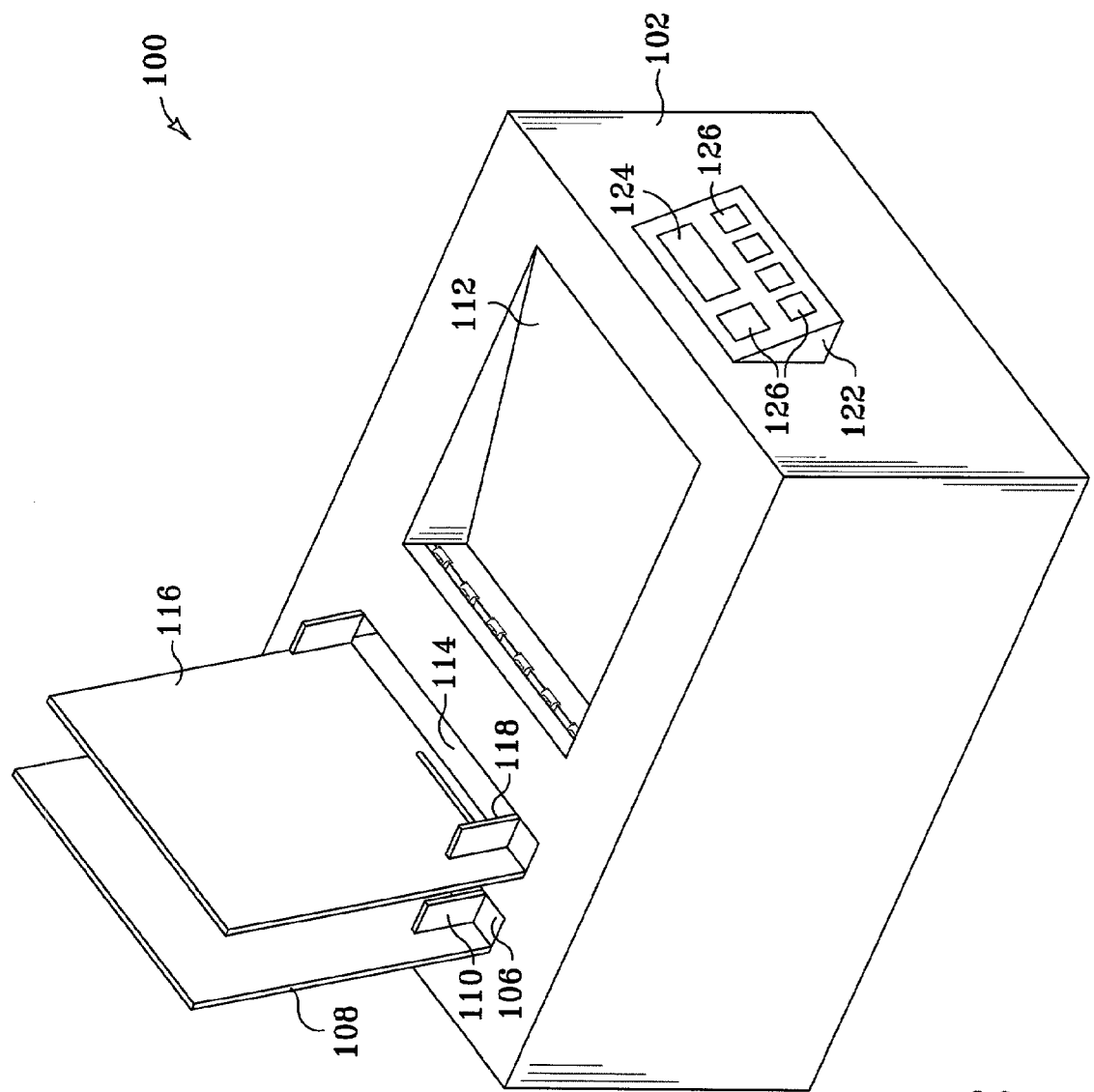
FIG. 2 is an isometric diagram depicting the imaging apparatus of FIG. 1.

Turning now to FIG. 2, an isometric diagram depicts the imaging apparatus 100 of FIG. 1. The imaging apparatus further includes a media output tray 112 which receives the imaging media after it has been imaged by the imaging apparatus 100. The imaging apparatus 100 has a user interface 122, which can include a user display 124 (such as an LED or LCD display) to allow the imaging apparatus to communicate information to a user. The user interface 122 can also include user input points (buttons or switches 126) which allow a user to provide instructions to the imaging apparatus 100.

As can be seen, the primary media tray 108 is configured to guide imaging media (not shown) into opening 106 in the body 102, and includes a moveable fence or guide 110 to allow the tray 108 to accommodate different sizes of imaging media. Likewise, the priority media tray 116 is configured to guide imaging media (not shown) into opening 114 in the body 102, and includes a moveable fence or guide 118 which works in conjunction with the stationary fence 120 to allow the priority tray 116 to accommodate different sizes of imaging media.

Figure 3:
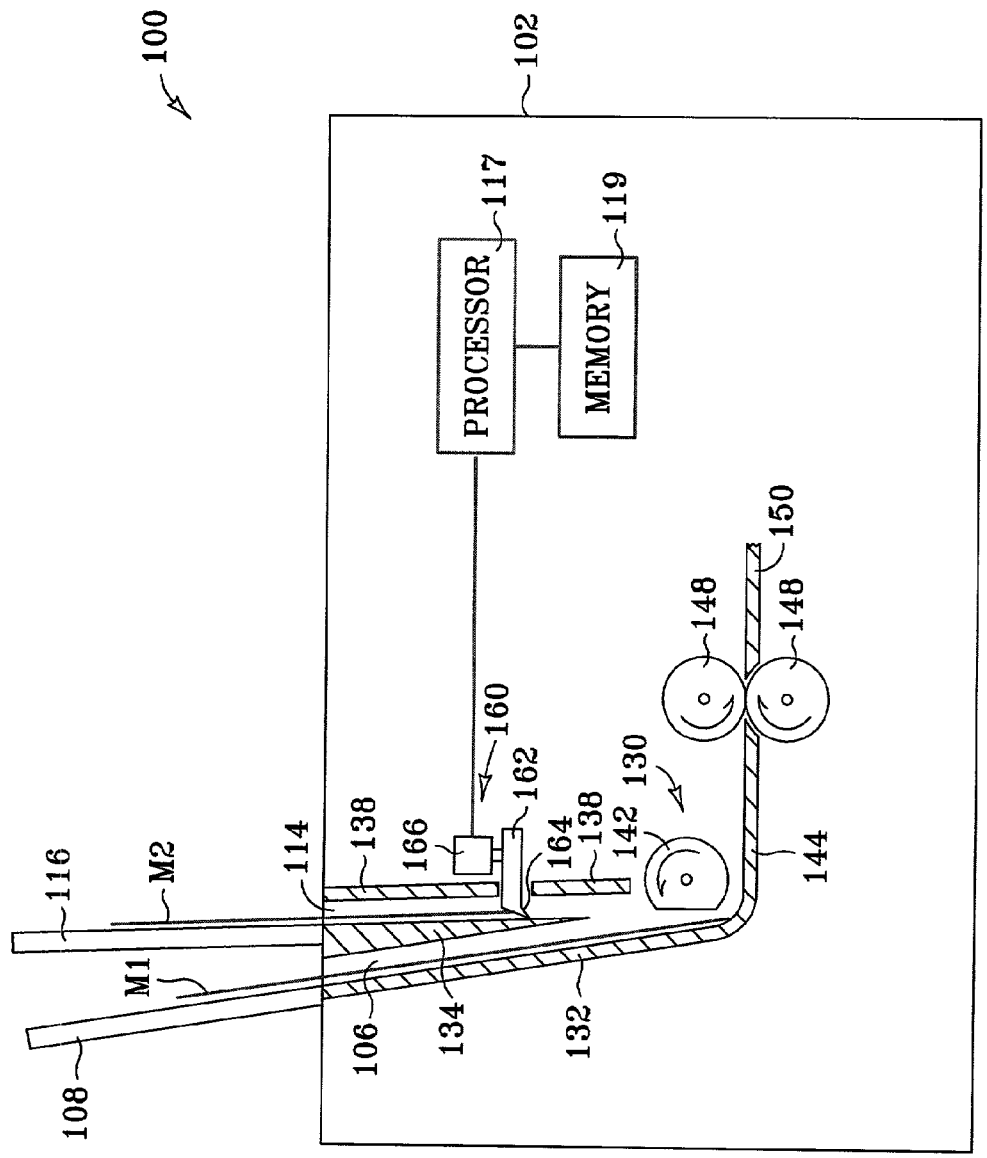
FIG. 3 is a side elevation sectional diagram of the imaging apparatus of FIG. 2.

Turning to FIG. 3, a front elevation, sectional view of the imaging apparatus 100 of FIG. 2 is depicted. It will be understood that the image-generating section of the imaging apparatus is not depicted in FIG. 3, such sections being well understood in the art, and not germane to the present invention. As can be seen, the channels 106 and 114 form respective media paths for imaging media provided from the respective primary media tray 108 and the priority media tray 116. The primary media feed channel 106 is defined by channel members 132 and 134, while the priority media feed channel 114 is defined by channel members 134 and 138. An exemplary sheet of media "M1" is depicted as being contained in the primary media tray 108, while an exemplary sheet of media "M2" is depicted as being contained in the priority media tray 116. It should be understood that item 108, as depicted, comprises a media support member to support media contained in the media channel 106, and that the primary media feed tray can actually be considered as comprising the media support member 108 and the channel members 132 and 134. Likewise, item 116, as depicted, comprises a media support member for supporting media contained in the media channel 106, and the priority media feed tray can actually be considered as comprising the media support member 116 and the channel members 134 and 138. Accordingly, when I say "priority tray 116", I mean to include all components which are used to support media within the priority media channel 114, and when I say "primary tray 108" I mean to include all components which are used to support media within the primary media channel 106.

Figure 5:
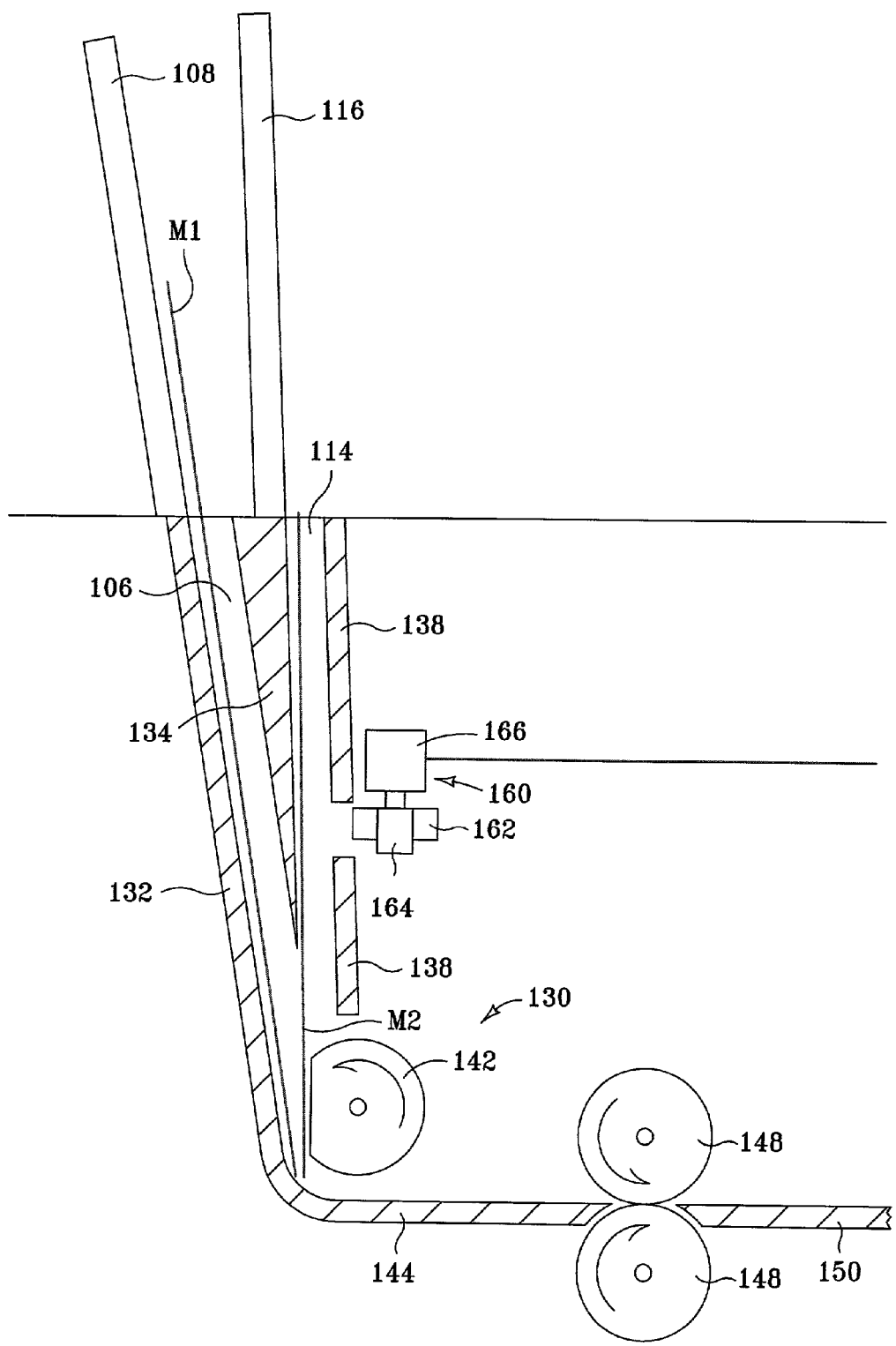
FIG. 5 is a detail of the paper feed section of the imaging apparatus depicted in FIG. 4, but showing imaging media in the priority feed tray released by the priority media release device.

As can be seen, media M1 which is placed in the primary media channel 106 is in proximity to media feed roller 142 in the media feed area 130. The media feed roller 142 is a "D" shaped roller such that when it rotates in the direction indicated by the arrow, it will contact a sheet of media in the media feed area 130 and move it along the media guide 144 towards secondary feed rollers 148, which then move the media into the main media guide 150 for imaging within the imaging section (not shown) of the imaging apparatus 100. However, if media M2 is placed in the media feed area 130 (as depicted in FIG. 5), then the primary feed roller 142 will contact media M2, moving it into the secondary feed rollers 148. Accordingly, whichever sheet media (i.e., primary media M1 or priority media M2) is directly exposed to the primary feed roller 142 will be the next sheet fed into the secondary feed rollers 148. In order to hold priority media sheet M2 out of the media feed area 130 until it is intended to be imaged, the imaging apparatus 100 further includes a priority media release device 160 (described more fully below).

The imaging apparatus 100 can also include a media lift plate (not shown) which can be positioned behind an opening in the channel section 132 to allow the lift plate to contact the lower portion of sheet media in the primary media tray 108. The lift plate is configured to urge a stack of sheet media in the primary media tray 108 towards the primary feed roller 142. A lift plate is a common feature included in prior art imaging apparatus, and is primarily employed to allow a plurality of sheets of media in the primary feed tray 108 to be inserted into the imaging apparatus 100 so that sheet media does not need to be fed a sheet at a time. When a lift plate is used, it will also urge a sheet of media from the priority media tray 116 towards the primary feed roller 142 when the priority media is the uppermost (right-most, with respect to FIG. 3) sheet in the stack.

The imaging apparatus 100 further includes a processor (such as a microprocessor, or a controller, such as a programmable controller) 117 which is in signal communication with the priority media release device 160. The controller 117 is further in signal communication with a computer readable memory device 119. Memory device 119 can be, for example, a random access memory ("RAM"), a read-only-memory ("ROM"), or a combination thereof, and can be provided on a microchip, magnetic media, or optical media. The memory device 119 can be used to store print jobs, as well as a series of computer executable instructions for controlling the imaging apparatus 100, as will be described more fully below.

Figure 4:
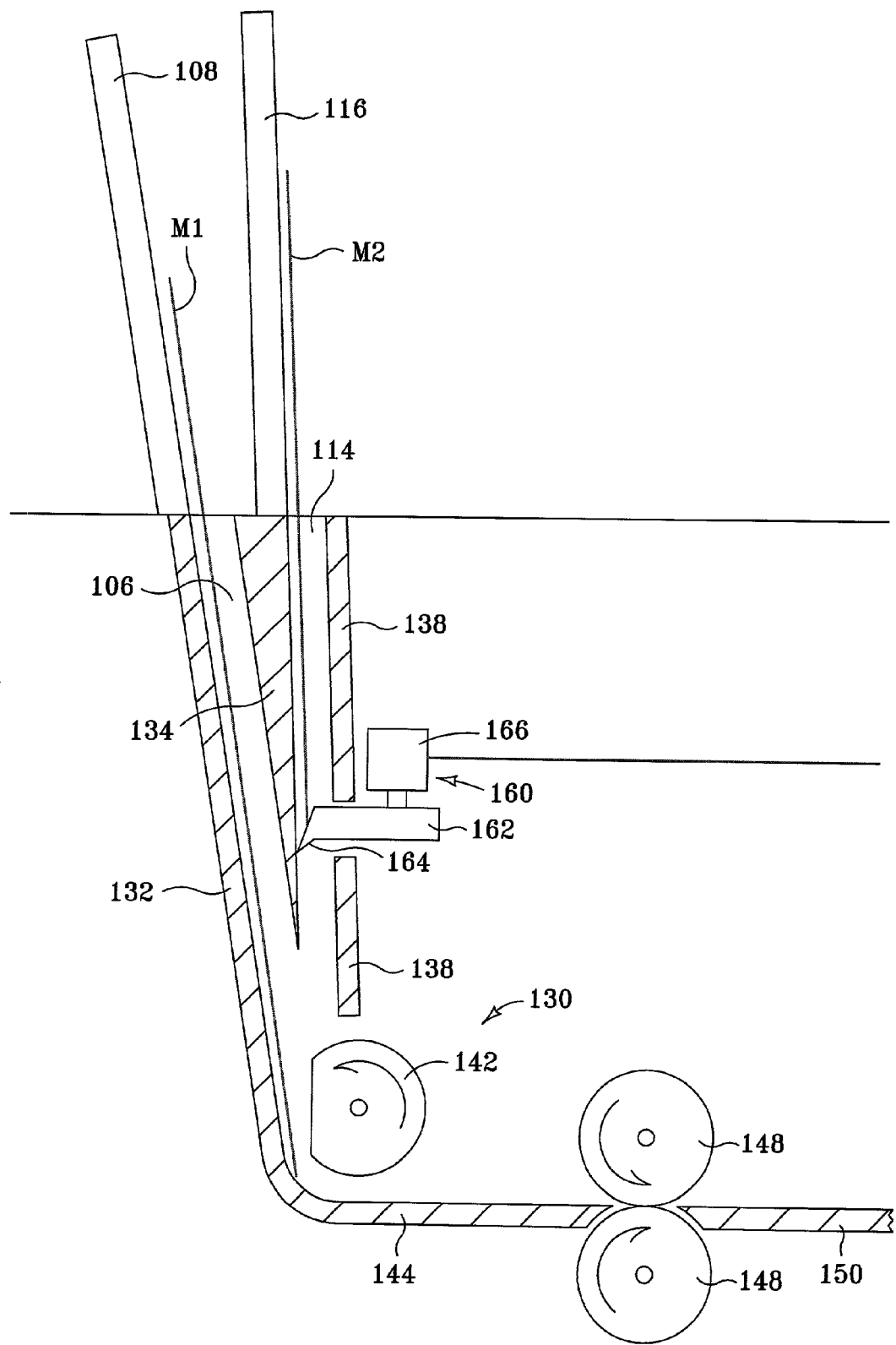
FIG. 4 is a detail of the paper feed section of the imaging apparatus depicted in FIG. 3, showing imaging media in a priority feed tray held in place by a priority media release device.

The priority media release device 160 is configured to selectively block media (M2) in the priority feed tray 108 from being released to the priority media feed mechanism 142, and admit media (M2) in the priority feed tray 108 to the priority media feed mechanism 142. This is illustrated in FIGS. 4 and 5, which are enlarged detail diagrams of the primary feed tray 108, the priority feed tray 116, and the media feed area 130 depicted in FIG. 3. With respect to FIG. 4, the priority media release device 160 comprises a priority media release member 164 which is shown in a first position wherein the release member 164 blocks media M2 in the priority feed tray 116 from being released to the priority media feed mechanism 142. Turning briefly to FIG. 5, it can be seen that the priority media release member 164 is moveable from the first position of FIG. 4 to a second position depicted in FIG. 5. In the second position the priority media release member 164 admits media (M2) in the priority feed tray 116 to the priority media feed mechanism (feed roller 142). Thus, if the feed roller 142 is actuated but the priority media M2 is in the first position (FIG. 4), the priority media M2 will not presented to the primary feed roller 142, and thus cannot be fed into the secondary feed rollers 148. However, if the media M2 has been released by the media release member 164 (as in FIG. 5), then the feed roller 142 can engage the media M2, and move it past guide 146 and into the secondary feed rollers 148, where the media can then be moved into the imaging section (not shown).

Figure 6:
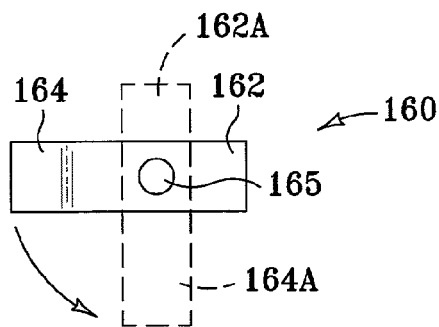
FIG. 6 is a plan view depicting a priority media release member used in the priority media release device depicted in FIG. 4.
Figure 7:
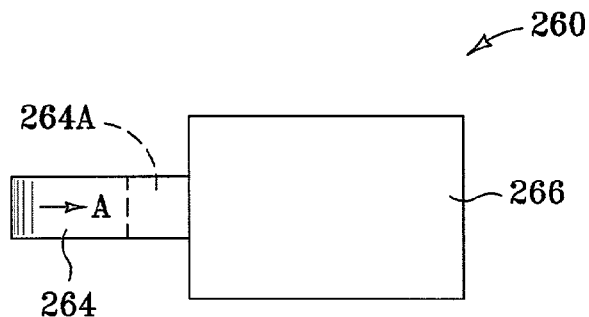
FIG. 7 is a plan view of an alternate configuration of a priority media release device.

The priority media release member 164 of FIGS. 4 and 5 is supported by a body member 162, which is connected to a shaft 165. The priority media release device 160 further comprises a media release member actuator 166 which is connected to the shaft 165, and is thus configured to selectively move the media release member 164 between the first position (FIG. 4) and the second position (FIG. 5). The actuator 166 can be, for example, a rotary solenoid. Turning to FIG. 6, the media release device 160 of FIGS. 4 and 5 is depicted in a plan view, and the actuator 166 has been removed for clarity. The view of release member 164 and body member 162 in solid lines corresponds the first position of the release member depicted in FIG. 4. The view of release member 164A and body member 162A in dashed lines corresponds to the second position of the release member 164, depicted in FIG. 5. FIG. 7 depicts a plan view of an alternate configuration of a priority media release device 260 that can be substituted for the media release device 160 of FIG. 6. The media release device 260 of FIG. 7 includes a media release member 264 which comprises a cylindrical bar supported by an actuator 266. The actuator 266 can be a linear solenoid, thus allowing the media release member to move in direction "A" to the position indicated by release member 264A.

Figure 8:
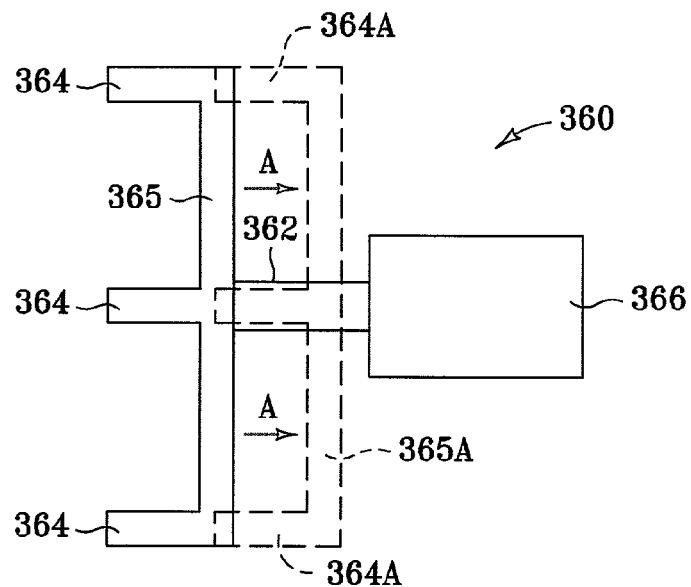
FIG. 8 is a plan view of another configuration of a priority media release device.

Turning to FIG. 8, yet another alternate configuration of a priority media release device 360 is depicted in plan view. The priority media release device 360 comprises a plurality of priority media release members 364 which are supported on a common support bar 365. Support bar 365 is connected to main body member 362, which can be a cylindrical shaft. The main body member 362 is in turn supported within the actuator 366, which can be a linear solenoid. The actuator 36 can thus selectively (and collectively) move the media release members 364 from a first position (indicated by solid lines) to a second position (indicated by dashed lines and numbered as 364A). In the first position, the release members 364 can block media in the priority feed tray (116, FIG. 4) from being released to the priority media feed mechanism (142, FIG. 4). In the second position, the media release members 364A can admit media in the priority feed tray to the priority media feed mechanism (as in FIG. 5). The use of a plurality of release members 364 can accommodate the situation where the media in the priority tray 116 is very narrow, or is offset from the center of the media tray 116.

As described above with reference to FIG. 3, the imaging apparatus 100 can further include a processor 117 in signal communication with the media release member actuator 166. The processor is configured to, upon receipt of a print job designating the use of media from the priority media tray 116, generate a priority media release actuation signal to actuate the media release member actuator 166. When the media release actuator 166 is actuated, media M2 within the priority media tray 116 will be released from the position depicted in FIG. 4 to the position depicted in FIG. 5. The media M2 can then be accessed by the priority media feed device (feed roller 142) and used for imaging the image portion of the print job.

As can be seen, one embodiment of the present invention provides for an imaging apparatus 100 having a priority media feed tray 116 and a priority media feed mechanism (feed roller 142) which is configured to extract media from the priority feed tray 116. The imaging apparatus includes the processor 117, and a priority media release device 160 under control of the processor. The priority media release device 160 is configured to admit media resident in the priority feed tray 116 to the priority media feed mechanism 142 when authorized by the processor 117.

Figure 11:
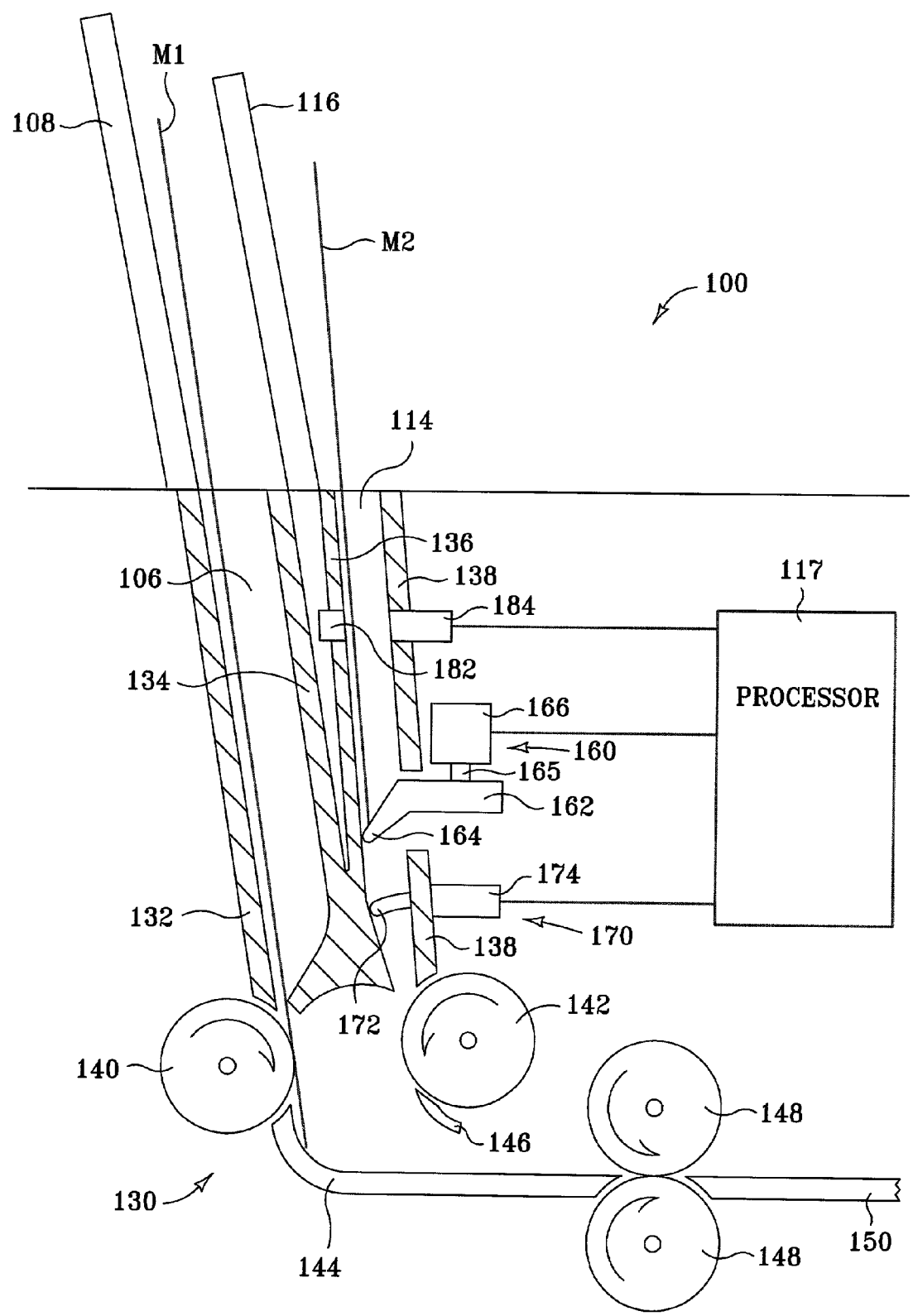
FIG. 11 is a FIG. 3 is a side elevation sectional diagram of the imaging apparatus of FIG. 2, showing how a media detection device and a priority media feed switch can be added to the imaging apparatus priority media tray.

Turning to FIG. 11, the sectional diagram of the imaging apparatus 100 is depicted, but a media detection device 184 and a priority media feed switch 170 have been placed within the priority media channel member 138. The media detection device 184, and the priority media feed switch 174 are in signal communication with the processor 117.

When employed, the priority media detection device 184 is be provided for the priority media feed tray 116. The media detection device 184 is configured to detect the presence (or absence) of media in the priority media tray 116, and to generate a media detection signal in response thereto. As depicted, the media detection device comprises a source 182 (such as an optical light source) supported in the first priority media channel member 134, and a detector 184 supported in the second priority media channel member 138. Thus, when a sheet of media blocks the source 182, the absence of a signal at the detector 184 is indicative of the presence of media in the priority tray 116. (It will be noted that in this case, the absence of a signal at the detector 184 corresponds to "generating a media detection signal".) The detection device 184 is in signal communication with the processor 117, allowing the processor to receive the media detection signal. The processor 117 can then be configured to generate the priority media release actuation signal (described in the previous paragraph) only upon receipt of the media detection signal. That is, once the processor 117 receives a print job designating the media to be used as media from the priority media tray 116, then before actuating the media release actuator 166, the processor can first determine if in fact media is present in the priority media tray 116. If no media is present in the priority media tray 116, then the processor 117 does not actuate the actuator 166, and preferably the processor temporarily stores the print job in the memory device 119, as will be described further below.

The imaging apparatus 100 of FIG. 3 can further include the priority media feed switch 170 which is located in the priority media feed channel 114, as depicted in FIG. 11. The media feed switch 170, as depicted, includes a moveable lever portion 172 which is preferably positioned within the media channel 114 between the media release member 164 and the priority media feed device (feed roller 142). The media feed switch 170 further includes a switch portion 174, which is in signal communication with the processor 117, and which generates a priority media feed activation signal when the lever portion 172 is depressed. Thus, when media M2 is released by the media release member 164, if the media properly drops into place as depicted in FIG. 5, then the lever portion 172 will be moved, generating the feed activation signal which is received by the processor 117. The processor will then be able to determine that the released media has in fact moved into position for feeding by the feed roller 142, and the processor can activate the feed roller 142 to move the media into the secondary feed rollers 148. However, if after actuating the media release device 160 the media feed switch 170 indicates that the media (M2, FIG. 10) has not moved into position to be engaged by the media feed roller 142A, then the processor 117 does not actuate the feed roller 142A. In this case, the processor 117 can temporarily hold the print job in the memory device 119, and can notify the user via the user display (124, FIG. 3) that the media in the priority tray 116 has not properly fed. Once the user repositions the media to move it into the position indicated in FIG. 5, then the processor 117 can engage the feed roller 142 and print the image from the print job onto the media M2.

The imaging apparatus 100 of FIG. 3 can further include the computer readable memory device 119 which is in signal communication with the processor 117. The computer readable memory device 119 can containing a priority media release device actuation routine which is configured to check for a predetermined condition and, when the predetermined condition is present, to instruct the processor 117 to authorize the priority media release device 160 (i.e., actuate the actuator 166) to thereby admit media from the priority feed tray 116 to the priority media feed mechanism 142. The priority media release device actuation routine can comprise a series of computer executable steps (i.e., a "program") which can be executed by the processor 117 to implement the functionality of the routine. The predetermined condition, which can be checked for by the release device actuation routine (under the control of the processor 117) can include the following: the designation of the use of imaging media from the priority media tray 116, as designated within a print job file; or the presence of media in the priority media tray 116 (which can be determined using a priority media detection device 184, as described above with respect to FIG. 11); or both of the foregoing.

Figure 9:
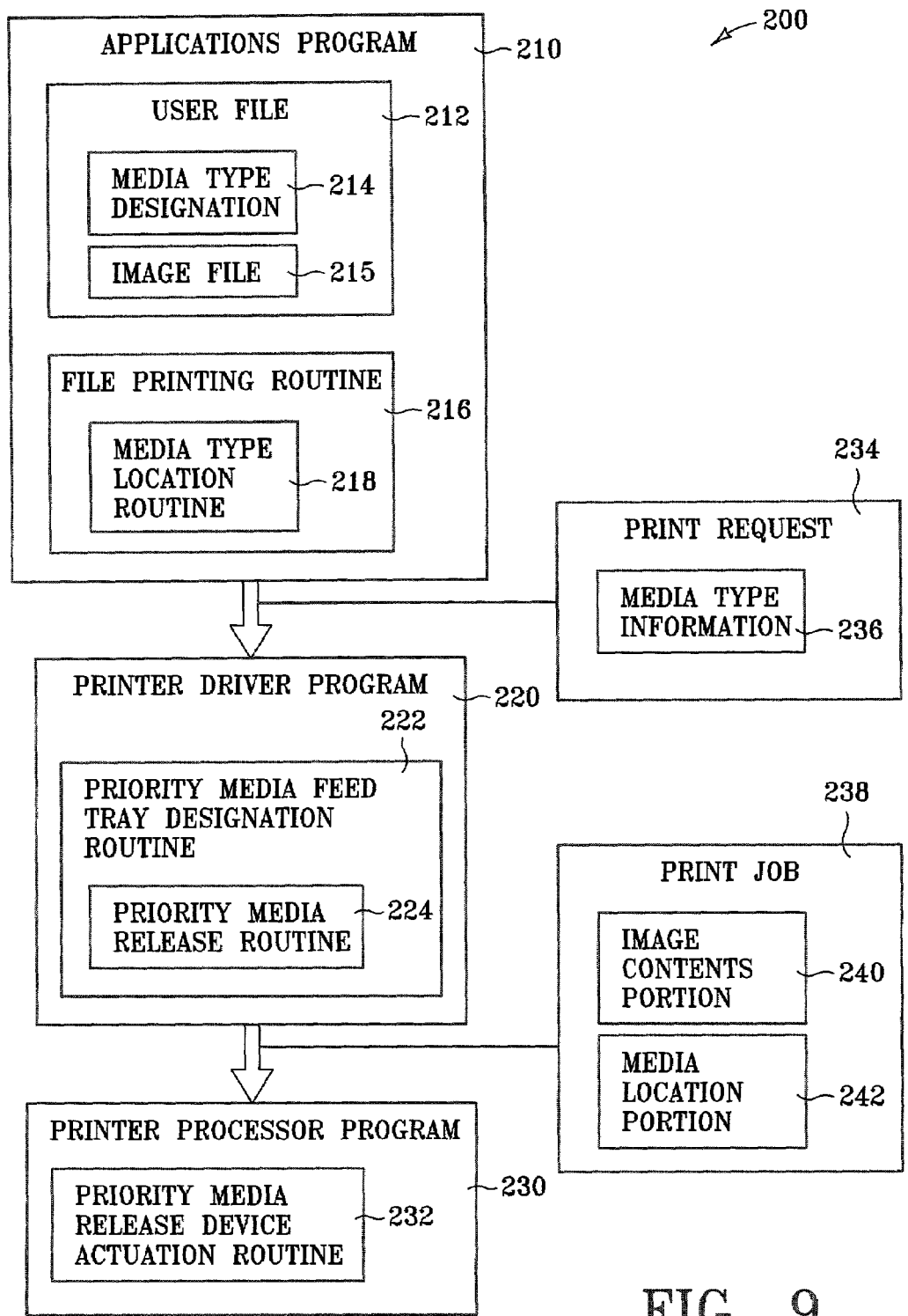
FIG. 9 is a schematic diagram depicting a relationship between software programs that can be used to implement the methods of the present invention.

Turning now to FIG. 9, a schematic diagram depicts a software system 200 in accordance with one embodiment of the present invention. The system 200 can be used to provide imaging media from a priority media tray (as tray 116 of FIG. 4) in an imaging apparatus (as 100 of FIG. 3) for imaging of an image file. The system 200 includes an applications program 210 configured to generate the image file 215 under the control of a user. The image file 215 is one portion of a user file 212, which also includes a media-type designation portion 214. The media-type designation portion 214 allows the user to selectively apply a media type designation to the image file 215, indicating the priority tray as the source of the imaging media. The media-type designation portion 214 can be generated automatically, or it can be generated as specified by a user. For example, if the applications program 210 is a word processing program and the user selects "envelope" as the style for the image file 215, then the media type designation portion 214 can automatically specify number 10 envelopes (approximately 242 mm wide by 105 mm long) as the media type. Alternately, the user can select one of several default media types (e.g., size A4 paper, legal sized paper, letter sized paper, etc.), or the user can specify a custom size for the media (e.g., cardstock consisting of 4 cm by 4 cm media).

The applications program 210 can also contain a file printing routine 216, which is typically accessed by the user via a dialog box. The file printing routine 216 can contain a media type location routine 218 which can contain the location of the media to be used when printing the file, as dictated by the media type designation 214. For example, if the user selects a standard size (such as a letter size of 8.5 inches by 11 inches) for the image file, then the media type location routine 218 determines that the default location for the media to be used is the primary media tray (e.g., trays 104 or 108 of FIG. 3). However, if the user selects a non-standard size (e.g., envelopes) or a non-standard media (e.g., labels) for the image file, then the media type location routine 218 can determine that the default location for the media to be used is the priority media tray (e.g., tray 116 of FIG. 3). Within the file printing routine 216 the user can give a command to print the image file, in which case the file printing routine 216 generates a print request 234. The print request 234 is a file which includes media type information 236 (e.g., media size or media type, and media location), and can include other default and user-specified instructions relevant to imaging of the image file (e.g., image orientation on the media, double-sided printing, etc.).

The print request file 234 is provided to a printer driver program 220, which is configured to generate a print job file 238 from the image file 215, and to apply a priority media release instruction (described more fully below) to the print job file 238 when the print request 234 indicates the priority tray (116, FIG. 3) as the source of the imaging media. The priority media release instruction is configured to cause imaging media from the priority media tray to be provided to the imaging apparatus for imaging of the image file by the imaging apparatus. That is, the priority media release instruction can be used to cause the processor 117 of FIGS. 3 and 11 to actuate the release device actuator 166 (FIG. 4), and thereby release media M2 (FIG. 4) to feed roller 142, in the manner described above. Although I describe the priority media release instruction as being "applied" to the print job file or as "part of" the print job file, it is understood that this expression should include providing the priority media release instruction in a separate file which is associated with the print job file.

More specifically, the printer drive program 220 contains a priority media feed tray designation routine 222, which itself includes a priority media release routine 224. The priority tray designation routine 222 considers the media type information section 236 of the print request file 234, and determines whether media from the priority tray is to be used to generate the image of the image file 215. If so, the priority tray designation routine 222 attaches the priority media release routine 224 to the print job file 238 (as part of the media location portion 242 of the print file 238). The print job file 238, generated by the printer drive program 220, is then transmitted to the imaging apparatus (100 of FIG. 3). The imaging apparatus has a printer processor program 230 which is configured to be executed by the processor (117, FIG. 3) to process the print job file 238, and to generate an image of the image file 215 on imaging media. When the print job file 238 contains the priority media release routine 224 (i.e., an instruction to implement the priority media release device actuation routine 232), then the processor 117 executes the release routine 232, causing the release actuator 166 (FIG. 4) to release media from the priority media tray 116.

It will be appreciated that the software system depicted in FIG. 9 is exemplary only, and that other software systems can be provided to achieve the same objects of the present invention. In short, the software system allows a user to generate (or retrieve) an image file, and to designate (either manually or automatically) in an associated print file that the image file is to be imaged on imaging media drawn from a priority media tray. When the print file includes the indicated designation (i.e., that media is to be drawing from the priority media tray), then the processor within the printer (e.g., processor 117 of FIG. 3) will be instructed to release media from the priority tray, and to generate the image onto the released media. Accordingly, when a print file does not contain the designation that the image file is to be imaged on media from the priority media tray, then the processor will not release media from the priority tray, and the image will be generated onto other imaging media (for example, imaging media from the primary tray 104 or 108 of FIG. 2).

Returning to FIG. 1, the applications program 210 of FIG. 9 can be accessed by users from workstations 20 and 22, and can be stored in the network server 30, or it can be stored directly in the workstations. Likewise, the printer driver program 220 of FIG. 9 can be stored in the network server 30, or, less commonly, in the workstations 20 and 22. The printer processor program 230 of FIG. 9 will typically be resident within the imaging apparatus 100. Accordingly, the network 10 can have a memory device (such as memory device 119 of FIG. 3) which contains a priority media release device actuation routine (232, FIG. 9). As described above, the release device actuation routine 232 is configured to read the print job (238, FIG. 9) and to check the print job for a designation that imaging media for the print job is to be provided from the priority media feed tray (116, FIG. 1). When the print job 238 contains the designation that imaging media for the print job is to be provided from the priority media feed tray, then the release device actuation routine 232 authorizes the processor (117, FIG. 3) to operate the priority media release device 160 to release the media from the priority media tray 116.

As described above, the imaging apparatus 100 in the network 10 (FIG. 1) can be provided with a media detection device (e.g., 184, FIG. 11, and as described above) which is configured to detect the presence of media in the priority feed tray 116. When media is in fact present in the priority media tray 116, the media detection device provides a media presence signal to the processor (117, FIG. 11). In this case, the priority media release device actuation routine (232, FIG. 9) can be further configured to authorize the processor 117 to operate the priority media release device (160, FIG. 11) only when (1) the print job (238, FIG. 9) contains the designation that media is to be provided from the priority tray, and (2) the processor receives a media presence signal. That is, the media release device 160 (FIG. 11) will not be actuated if no media is detected in the priority tray 116, notwithstanding the presence of an instruction in the print file (238, FIG. 9) to implement the priority media release routine (232, FIG. 9). In this case, the processor (117, FIG. 11) can temporarily store the print file in a print queue in the memory device 119 (FIG. 3) until imaging media has been provided to the priority media tray 116, as determined by the media detection device (184, FIG. 11). Until media is provided to the priority media tray 116, the processor 117 can print jobs in the print queue around the print job which requires media from the priority media tray.

Another embodiment of the present invention provides for a method of providing imaging media to an imaging apparatus (e.g., imaging apparatus 100 of FIGS. 1–3, and 11) to allow the imaging apparatus to use an image file (e.g., file 215, FIG. 9) to generate an image onto the imaging media. The method includes providing the imaging media in a priority media tray (such as tray 116 of FIGS. 2–5 and 11), and providing the image file with an imaging media release command (such as priority media release routine 224 of FIG. 9). The method further includes releasing the imaging media from the priority media tray to the imaging apparatus only when the image file has an imaging media release command. As described above, media can be selectively released from the priority tray using a media release device, such as device 160 of FIGS. 3–6 and 11, 260 of FIG. 7, and 360 of FIG. 8. Once the media has been released from the priority media tray, the method can include imaging the image file onto the released imaging media. This can be accomplished by feeding the released media into a main media guide (150, FIG. 3) and then using known imaging methods.

This method of the present invention can also include generating the image file using an application software program (such as applications program 210 of FIG. 9), and designating a selected imaging media type for the image file using the application software program. Specifically, the media type can be designated by the media type designation portion 214 of the application program 210 of FIG. 9. As described above, the image file can be automatically provided with the imaging media release command as a result of designating the selected imaging media type. For example, by designating the media type as "envelopes", the media type designation routine can automatically determine that the media is to be provided from the priority media tray, and can automatically append the necessary instructions to the print request file (234, FIG. 9) to cause a priority media release instruction (224, FIG. 9) to be added to the print job file (238, FIG. 9).

The method of the invention can also include providing the imaging media (such as media M1, FIGS. 3–5 and 11) in a primary media tray (e.g., tray 108, FIGS. 3 and 11). In this case, when a first imaging file includes an imaging media release command (e.g., 224, FIG. 9, as appended to print job file 238), media is released from the priority media tray (e.g., 116, FIG. 4) in the manner described above. However, when a second image file (presented to the processor 117 of FIGS. 3 and 11 as a print job file) does not have an imaging media release command appended thereto, then imaging media is fed to the imaging apparatus from the primary media tray. In this case, the second image file will be imaged onto the imaging media fed from the primary media tray, rather than from the priority tray. As can be seen, this addresses one of the problems of the prior art, which is that a print job could result in an image file inadvertently being imaged onto media from the priority tray, when the user did not desire such. That is, by only releasing media from the priority tray when a print file contains an instruction directing the processor to release the media, print jobs not containing the instruction will not be imaged onto media fro the priority tray.

Another method of the present invention provides for a method of processing a print job (such as 238 of FIG. 9) file having an image file portion (such as 215 of FIG. 9). The method includes providing an imaging apparatus (such as apparatus 100 of FIGS. 1–5 and 11) having a primary media tray (such as tray 116), and a priority media tray (such as trays 104 and 108 of FIGS. 2 and 11). Each media tray is configured to contain imaging media. The method also includes providing the print job file (such as by using the applications program 210 and the printer driver program 220 of FIG. 9), and checking the print job file for the presence of a priority tray media release command. This later step can be accomplished using the priority media tray designation routine 222 of FIG. 9. The method further includes checking for the presence of imaging media in the priority media tray (as for example, by utilizing the media detection device 184 of FIG. 11, described above). When imaging media is present in the priority media tray (as determined, for example, by the media detection device), and when the priority tray media release command is present in the print job file, then the method includes releasing the imaging media from the priority media tray to the imaging apparatus. The act of releasing the media from the priority tray can be accomplished, for example, by using the media release device 160 of FIGS. 3–5 and 11, in conjunction with the priority media release routine 232 of FIG. 9. The method can then include imaging the image file portion onto the released imaging media.

Further, when the priority tray media release command is not present in the print job file, and imaging media is present in the priority media tray, this method can also include not releasing the imaging media from the priority media tray. In this case, the image file portion of the print job will then be imaging the on imaging media from the primary media tray. That is, a print job having the priority tray media release command will be imaged onto media from the priority tray, and a print job not having the priority tray media release command will be imaged onto media from the primary tray. The method can further include saving (storing) the print job file in a memory device (such as 119 of FIG. 3) when the priority tray media release command is present in the print job file, but imaging media is not present in the priority media tray (as determined by the media detection device 184 of FIG. 11, for example). In the case where the print job file requiring media from the priority tray is saved in the memory device due to a lack of imaging media in the priority tray, the method can include re-checking the priority tray for the presence of imaging media. When imaging media is ultimately detected as being present in the priority media tray, the method can include retrieving the print job file from the memory device, releasing the imaging media from the priority media tray, and imaging the image file portion on the released imaging media.

Figure 10:
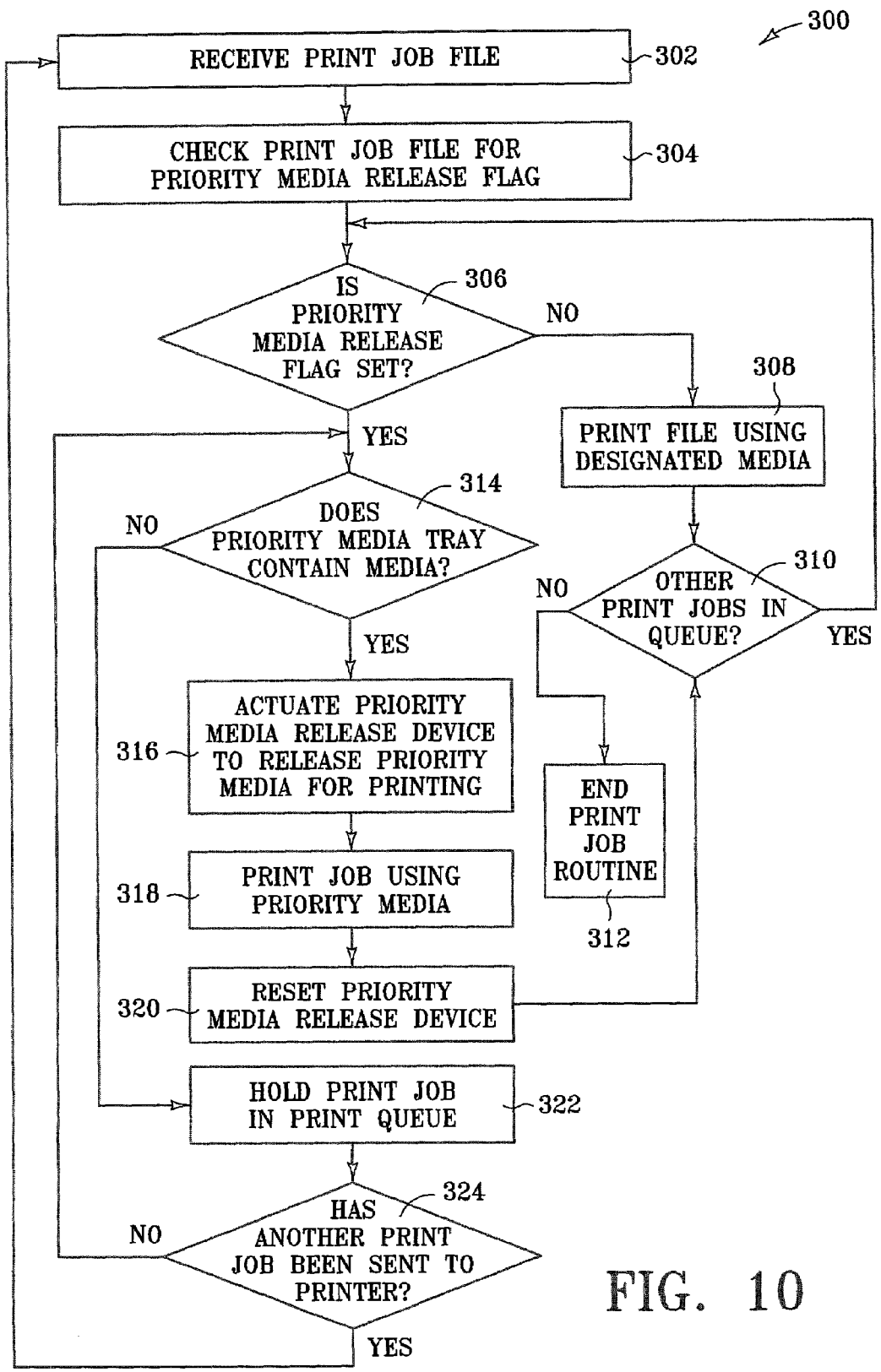
FIG. 10 is a schematic diagram of a flowchart depicting a series of steps that can be used to implement methods of the present invention.

Turning to FIG. 10, a flow chart 300 depicts a series of steps that can be implemented as selected computer executable steps to implement the methods of he present invention. The steps depicted in FIG. 10 can be implemented using any or all of the applications program 210, the printer drive program 220, and the printer processor program 230, all of FIG. 9. The steps of the flow chart 300 can be executed by a processor, such as processor 117 of FIGS. 3 and 11, and can be stored in one or more memory devices, including the memory device 119 of FIG. 3.

At step 302 of the flowchart 300 of FIG. 10, the imaging apparatus (such as apparatus 100 of FIGS. 1–3) receives a print job file (such as file 238 of FIG. 9). At step 304, the processor (e.g., 117, FIGS. 3 and 11) looks for a priority media release flag, which can be the priority media release instruction 224 of FIG. 9 (as appended to the print job file 238). At step 306, if the processor determines that the priority release media flag is not set, then at step 308 the print job is printed using the designated media, such as media M1 in primary tray 108 (FIGS. 4 and 11). Then at step 310 the processor checks to determine whether additional print jobs are stored in a print queue (as will be described further below). If no additional print jobs are in the print queue, then the print job routine is terminated at step 312. However, if at step 306 the processor determines that the priority release media flag is set (indicating that the print job is to be imaged on media from the priority tray), then at step 314 the processor checks to determine whether the priority media tray (e.g., tray 116 of FIGS. 4 and 11) does indeed contain media. This can be accomplished using the media detection device 184 (FIG. 11), described above. If it is determined that the priority tray indeed contains imaging media, then at step 316 the priority media release device (e.g., 160 of FIGS. 3 and 11) is actuated to release the media in the priority tray for imaging. Then, at step 318, the imaging apparatus images the image from the print job onto the media released from the priority tray. Thereafter, at step 320, the media release device (e.g., 160, FIGS. 6 and 11) is reset (for example, to the position depicted in FIG. 4), and the processor then checks (at step 310) to determine whether there are additional print jobs in the print queue. If not, the print job routine is terminated at step 312.

If, at step 314, the processor determines that the priority media tray does not contain imaging media (for example, as determined by the media detection device 184 of FIG. 11), then at step 322 the print job file can be put on hold and stored in the print job queue (such as in memory device 119 of FIG. 3). Then, at step 324, the processor can check to determine whether another print job has been transmitted to the imaging apparatus. If so, the processor will proceed to step 302, and will process the new print job in the manner described above. However, if at step 324 the processor determines that no additional print jobs have been transmitted to the printer, then the processor will return to step 314 to determine whether imaging media is now present in the priority tray. If so, any print job in the print queue requiring media from the priority tray will be printed, using steps 316, 318, 320 and 310. Since the processor is typically configured to process print jobs in the print queue on a first-in-first-out basis, if two or more jobs in the print queue require media from the priority tray, then the first such job placed in the print queue will be imaged onto the first media placed into the priority media tray.

It is understood that the flow chart 300 of FIG. 10 is exemplary only, and that additional or different steps can be employed to accomplish the methods of the present invention. For example, if the imaging apparatus does not include a priority media tray media detection device (e.g., 184, FIG. 11), then steps 314, 322 and 324 can be eliminated. In this case either the print job will be considered to have been printed (and will be deleted from the printer memory 119 of FIG. 3), or all other incoming print jobs will be held until imaging media is provided to the priority media tray.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An imaging apparatus comprising:
a primary media feed tray;
a priority media feed tray;
a media feed mechanism configured to extract media from the priority feed tray and the primary feed tray; and
a priority media release device configured to selectively block media in the priority feed tray from being released to the media feed mechanism, and admit media in the priority feed tray to the media feed mechanism.

2. The imaging apparatus of claim 1, and wherein the priority media release device comprises a plurality of priority media release member selectively moveable from a first position to block media in the priority feed tray from being released to the priority media feed mechanism, to a second position to admit media in the priority feed tray to the priority media feed mechanism.

3. An imaging apparatus comprising:
a primary media feed tray;
a priority media feed tray;
a media feed mechanism configured to extract media from the priority feed tray and the primary feed tray; and
a priority media release device configured to selectively block media in the priority feed tray from being released to the media feed mechanism, and admit media in the priority feed tray to the media feed mechanism, wherein the priority media release device comprises a priority media release member selectively moveable from a first position to block media in the priority feed tray from the media feed mechanism, to a second position to admit media in the priority feed tray to the media feed mechanism.

4. The imaging apparatus of claim 3, and wherein the priority media release device further comprises a media release member actuator configured to selectively move the media release member between the first and the second positions.

5. The imaging apparatus of claim 4, and further comprising a processor in signal communication with the media release member actuator, and wherein the processor is configured to, upon receipt of a print job designating the use of media from the priority media tray, generate a priority media release actuation signal to actuate the media release member actuator.

6. The imaging apparatus of claim 5, and further comprising a media detection device configured to detect the presence of media in the priority media tray, to generate a media detection signal in response thereto, and to transmit the media detection signal to the processor, and further wherein the processor is configured to generate the priority media release actuation signal only upon receipt of the media detection signal.

7. The imaging apparatus of claim 3, and wherein the priority media release member is configured to be rotationally moved between the first and section positions.

8. The imaging apparatus of claim 3, and wherein the priority media release member is configured to be transitionally moved between the first and section positions.

9. An imaging apparatus comprising:
a primary media feed tray;
a priority media feed tray;
a media feed mechanism configured to extract media from the priority feed tray and the primary feed tray;
a processor;
a priority media release device movable between a media blocking position and a media admitting position under control of the processor.

10. The imaging apparatus of claim 2, and further comprising a computer readable memory device in signal communication with the processor, the computer readable memory device containing a priority media release device actuation routine configured to check for a predetermined condition and, when the predetermined condition is present, to instruct the processor to authorize the priority media release device to admit media from the priority feed tray into the media feed mechanism.

11. The imaging apparatus of claim 10, and wherein the priority media release device actuation routine is configured to check a print job file for the predetermined condition, and wherein the predetermined condition comprises the designation of use of media from the priority media tray.

12. The imaging apparatus of claim 11, and further comprising a priority media detection device configured to detect the presence of media in the priority media tray, to generate a media detection signal in response thereto, and to transmit the media detection signal to the processor, and wherein the predetermined condition further comprises the presence of media in the priority media tray.

13. The imaging apparatus of claim 10, and further comprising a priority media detection device configured to detect the presence of media in the priority media tray, to generate a media detection signal in response thereto, and to transmit the media detection signal to the processor, and wherein the predetermined condition comprises the presence of media in the priority media tray.

14. An imaging apparatus comprising:
a primary media feed tray;
a priority media feed tray;
a media feed mechanism configured to extract media from the priority feed tray and the primary feed tray; and
a priority media release device comprising a media release member which is moveable between a first position wherein the release member blocks media in the priority feed tray from being released to the media feed mechanism, and a second position wherein the release member admits media in the priority feed tray to the media feed mechanism.

15. The imaging apparatus of claim 14, and wherein the media release member is rotatably moveable between the first position and the second position.

16. The imaging apparatus of claim 15, and wherein the priority media release device further comprises a rotary actuator attached to the media release member to move the release member between the first and second positions.

17. The imaging apparatus of claim 14, and wherein the media release member is translatably moveable between the first position and the second position.

18. The imaging apparatus of claim 17, and wherein the priority media release device further comprises a linear actuator attached to the media release member to move the release member between the first and second positions.

19. The imaging apparatus of claim 14, and wherein the priority media feed tray defines a priority media feed path, and the media release member protrudes into the priority media feed path when the media release member is in the first position.

20. The imaging apparatus of claim 14, and wherein the priority media release device further comprises a plurality of elongated release members which are moveable between the first position and the second position.

21. A system to provide imaging media from a priority media tray in an imaging apparatus for imaging of an image file, comprising:
an applications program configured to generate the image file under the control of a user, and to selectively apply a media type designation to the image file indicating the priority tray as the source of the imaging media;
a printer driver program configured to generate a print job file from the image file, and to apply a priority media release instruction to the print job file when the image file indicates the priority tray as the source of the imaging media, and wherein the priority media release instruction is configured to cause imaging media from the priority media tray to be released to the imaging apparatus for imaging of the image file by the imaging apparatus;
wherein the applications program is configured to automatically apply the media type designation to the image file indicating the priority tray as the source of the imaging media.

22. The system of claim 21, and wherein the media type designation is automatically applied to the image file when the image to be imaged is one of an envelope or a label.

23. A method of providing imaging media to an imaging apparatus to allow the imaging apparatus to use an image file to generate an image onto the imaging media, comprising:
providing the imaging media in a priority media tray;
providing the image file with an imaging media release command; and
releasing the imaging media from the priority media tray to the imaging apparatus only when the image file has an imaging media release command, wherein the releasing comprises moving a member from a blocking position to a non-blocking position.

24. The method of claim 23, and further comprising imaging the image file onto the released imaging media.

25. The method of claim 23, and further comprising:
generating the image file using an application software program;
designating a selected imaging media type for the image file using the application software program; and
wherein the image file is automatically provided with the imaging media release command as a result of designating the selected imaging media type.

26. The method of claim 23, and wherein the image file is first image file, the method further comprising:
providing the imaging media in a primary media tray;
providing a second image file, the second image file not having an imaging media release command; and
feeding imaging media from the primary media tray and imaging the second image file onto the imaging media fed from the primary media tray.

27. A method of processing a print job file having an image file portion, comprising:
providing an imaging apparatus having a primary media tray and a priority media tray, each media tray configured to contain imaging media;
providing the print job file;
checking the print job file for the presence of a priority tray media release command;
checking for the presence of imaging media in the priority media tray; and
when imaging media is present in the priority media tray, and the priority tray media release command is present in the print job file, moving a member from a blocking position to a non-blocking position.

28. The method of claim 27, and further comprising:
when the priority tray media release command is not present in the print job file, and imaging media is present in the priority media tray, not releasing the imaging media from the priority media tray, and imaging the image file portion on media from the primary media tray.

29. The method of claim 27, and further comprising:
when the priority tray media release command is present in the print job file, and imaging media is not present in the priority media tray, saving the print job file in a memory device.

30. The method of claim 29, and further comprising:
re-checking for the presence of imaging media in the priority media tray; and
when imaging media is present in the priority media tray, retrieving the print job file from the memory device, releasing the imaging media from the priority media tray to the imaging apparatus, and imaging the image file portion on the released imaging media.

* * * * *

UNITED STATES PATENT AND TRADEMARK OFFICE
CERTIFICATE OF CORRECTION

| | | |
|---|---|---|
| PATENT NO. | : 7,102,800 B2 | Page 1 of 1 |
| APPLICATION NO. | : 10/087470 | |
| DATED | : September 5, 2006 | |
| INVENTOR(S) | : Brian Tuchtenhagen | |

It is certified that error appears in the above-identified patent and that said Letters Patent is hereby corrected as shown below:

In column 14, line 33, in Claim 7, delete "section" and insert -- second --, therefor.

In column 14, line 36, in Claim 8, delete "section" and insert -- second --, therefor.

In column 14, line 47, in Claim 10, delete "claim 2," and insert -- claim 9, --, therefor.

Signed and Sealed this

Sixth Day of January, 2009

JON W. DUDAS
*Director of the United States Patent and Trademark Office*